(12) United States Patent
Wu (10) Patent No.: US 9,636,896 B2
(45) Date of Patent: May 2, 2017

(54) METHOD AND APPARATUS FOR TOILET SEAT WITH THREE-DIMENSIONAL IMAGE AND SMOOTH SURFACE

(75) Inventor: Chengdon Wu, Allen, TX (US)

(73) Assignee: Topseat International, Inc., Plano, TX (US)

( * ) Notice: Subject to any disclaimer, the term of this patent is extended or adjusted under 35 U.S.C. 154(b) by 1283 days.

(21) Appl. No.: 13/563,093

(22) Filed: Jul. 31, 2012

(65) Prior Publication Data

US 2014/0033417 A1 Feb. 6, 2014

(51) Int. Cl.
| A47K 13/14 | (2006.01) |
| B32B 27/32 | (2006.01) |
| A47K 13/02 | (2006.01) |
| B32B 7/12 | (2006.01) |
| B32B 21/02 | (2006.01) |
| B32B 21/08 | (2006.01) |
| B32B 27/30 | (2006.01) |
| B32B 27/36 | (2006.01) |
| B29C 45/14 | (2006.01) |
| B29L 31/00 | (2006.01) |

(52) U.S. Cl.
CPC .............. *B32B 27/32* (2013.01); *A47K 13/02* (2013.01); *B29C 45/14778* (2013.01); *B32B 7/12* (2013.01); *B32B 21/02* (2013.01); *B32B 21/08* (2013.01); *B32B 27/304* (2013.01); *B32B 27/308* (2013.01); *B32B 27/36* (2013.01); *B32B 27/365* (2013.01); *B29C 45/14811* (2013.01); *B29L 2031/7694* (2013.01); *B32B 2307/402* (2013.01); *B32B 2451/00* (2013.01); *Y10T 428/24521* (2015.01)

(58) Field of Classification Search
CPC .................................. A47K 13/02; A47K 13/24
USPC .......................................... 4/242.1, 234, 237
See application file for complete search history.

(56) References Cited

U.S. PATENT DOCUMENTS

| 840,032 A | 1/1907 | Willms |
| 848,043 A | 3/1907 | McCord et al. |
| 1,616,020 A | 2/1927 | Wolf |
| 1,636,649 A | 7/1927 | Richardson |
| 1,829,526 A | 10/1931 | Leslie |
| 2,771,612 A | 11/1956 | Samuels |

(Continued)

FOREIGN PATENT DOCUMENTS

| CN | 2689877 | 4/2005 |
| CN | 101664289 | 3/2010 |

(Continued)

OTHER PUBLICATIONS

International Search Report dated Jan. 22, 2014 in connection with International Patent Application No. PCT/US2013/052847, 3 pages.

(Continued)

*Primary Examiner* — Huyen Le (57) ABSTRACT

A toilet lid is manufactured with a lenticular three-dimensional image. The toilet lid includes a protective cover sheet attached to the lenticular image. The toilet lid also includes a sealing agent applied to the edges of the protective cover sheet and lenticular image, resulting in a protected lenticular image. The toilet lid further includes the protected lenticular image incorporated into the toilet lid.

20 Claims, 10 Drawing Sheets

(56) References Cited

U.S. PATENT DOCUMENTS

| | | | |
|---|---|---|---|
| 3,484,876 A * | 12/1969 | Thomas | A47K 13/02 4/234 |
| 3,772,111 A | 11/1973 | Ginsburg | |
| 3,863,277 A | 2/1975 | Harrison | |
| 4,115,127 A | 9/1978 | Ikeda et al. | |
| 4,318,213 A | 3/1982 | Blount | |
| 5,457,515 A * | 10/1995 | Quadracci | B29D 11/00288 101/483 |
| 5,706,528 A | 1/1998 | Broback | |
| 5,754,984 A | 5/1998 | Bermudez-Schmeelk | |
| 5,829,073 A * | 11/1998 | Lee | A47K 13/00 4/242.1 |
| 5,896,230 A * | 4/1999 | Goggins | G02B 27/2214 355/22 |
| 6,640,349 B2 | 11/2003 | Toldo et al. | |
| 6,959,458 B1 | 11/2005 | Tsai | |
| 7,621,850 B2 | 11/2009 | Piaget et al. | |
| 8,506,742 B2 | 8/2013 | Terfloth et al. | |
| 2003/0024036 A1 | 2/2003 | Toldo et al. | |
| 2003/0121090 A1 | 7/2003 | Cecchin | |
| 2004/0096601 A1 | 5/2004 | Raymond | |
| 2004/0098795 A1 | 5/2004 | Benkhardt et al. | |
| 2004/0108606 A1 | 6/2004 | Goggins | |
| 2005/0076424 A1* | 4/2005 | Mattingly | A47K 13/24 4/242.1 |
| 2005/0120469 A1 | 6/2005 | Benkhardt et al. | |
| 2005/0186393 A1 | 8/2005 | Wilson | |
| 2006/0272079 A1 | 12/2006 | Alegria | |
| 2007/0144659 A1 | 6/2007 | De La Fuente | |
| 2007/0169255 A1 | 7/2007 | Benkhardt et al. | |
| 2007/0294821 A1 | 12/2007 | Griner | |
| 2007/0298229 A1 | 12/2007 | Rasmusson et al. | |
| 2008/0008885 A1* | 1/2008 | Terfloth | B29C 63/02 428/411.1 |
| 2009/0068453 A1* | 3/2009 | Chung | B32B 27/08 428/337 |
| 2009/0155593 A1 | 6/2009 | O'Brien et al. | |
| 2011/0146792 A1 | 6/2011 | Wu et al. | |

FOREIGN PATENT DOCUMENTS

| | | | |
|---|---|---|---|
| CN | 101664289 A | * | 3/2010 |
| CN | 201631101 | | 11/2010 |
| GB | 422797 | | 1/1935 |
| GB | 2021176 | | 11/1979 |
| GB | 2380444 | | 4/2003 |
| WO | WO 2004110743 | | 12/2004 |

OTHER PUBLICATIONS

Written Opinion of International Searching Authority dated Jan. 22, 2014 in connection with International Patent Application No. PCT/US2013/052847, 6 pages.

International Search Report and Written Opinion issued for PCT/US2012/025864 dated Jan. 25, 2013, 8 pgs.

U.S. Office Action issued for U.S. Appl. No. 13/083,161 dated Sep. 26, 2014, 10 pgs.

International Search Report and Written Opinion issued for PCT/US2014/014487 dated May 22, 2014, 8 pgs.

Extended European Search Report dated Sep. 4, 2014 in connection with European Patent Application Serial No. 12774191.6, 7 pages.

Joel Howald, Examiner.com, "How to Make a Shadow Box Display Case", Jan. 7, 2010, 9 pgs.

International Search Report and Written Opinion issued for PCT/US2012/034252 dated Jul. 5, 2012, 8 pgs.

Extended European Search Report dated Feb. 16, 2015 in connection with European Patent Application No. EP 12767262.4, 6 pgs.

Office Action dated Jan. 13, 2016 in connection with U.S. Appl. No. 14/065,155, 13 pgs.

Office Action dated Jun. 17, 2015 in connection with U.S. Appl. No. 13/486,872, 7 pgs.

Communication Pursuant to Rules 70(2) and 70a(2) EPC dated Mar. 5, 2015 in connection with European Patent Application No. 12767262.4; 1 page.

Office Action dated Jul. 1, 2015 in connection with U.S. Appl. No. 13/083,161, 9 pgs.

International Search Report and Written Opinion issued for PCT/US2013/052847 dated Jan. 22, 2014, 8 pgs.

European Office Action issued for EP 12774191.6 dated Apr. 11, 2016, 6 pgs.

* cited by examiner

METHOD AND APPARATUS FOR TOILET SEAT WITH THREE-DIMENSIONAL IMAGE AND SMOOTH SURFACE

TECHNICAL FIELD

This disclosure is generally directed to toilets and more particularly to a toilet lid and seat that includes a lenticular three-dimensional image with a smooth protective layer.

BACKGROUND

Toilet seats and lids have existed in various forms for many decades. A toilet seat provides a surface for an occupant to comfortably sit and a toilet lid provides a protective cover for the toilet facility. Generally, toilet seats and lids are made of wood or plastic materials.

Additionally, most toilet seats and lids have plain, unadorned surfaces that do not include any type of decoration or permit any artistic expression. Some conventional toilet seats have surfaces that are adorned with silk-screen printing, hand painting, water-transfer printing, heat transfer printing, and the like. However, the surfaces of these seats, like plain toilet seats, can wear, chip off, degrade, or otherwise become damaged over time. There are also polyresin toilet seats that are made from resin compounds and are typically clear with optional decorative inserts. However, polyresin toilet seats are typically heavy and expensive to manufacture.

Recently, lenticular three-dimensional (3-D) images have been used as decorations on toilet lids and seats. However, the inherent shape of the surface of a lenticular lens prevents the surface from being smooth, making cleaning more difficult than for some surfaces without the lenticular lens.

SUMMARY

According to an embodiment of the present disclosure, a composite material with a lenticular three-dimensional image includes a protective cover sheet attached to the lenticular image. The composite laminar material also includes a sealing agent applied to the edges of the protective cover sheet and lenticular image, resulting in a protected lenticular image. The composite laminar material further includes the protected lenticular image incorporated into the composite material.

In another embodiment, a toilet lid having a lenticular three-dimensional image includes a protective cover sheet attached to the lenticular image. The toilet lid also includes a sealing agent applied to the edges of the protective cover sheet and lenticular image, resulting in a protected lenticular image. The toilet lid further includes the protected lenticular image incorporated into the toilet lid.

In still another embodiment a method of manufacturing a toilet lid includes attaching a protective cover sheet to the lenticular image. The method also includes applying a sealing agent to edges of the protective cover sheet and lenticular image, resulting in a protected lenticular image. The method further includes incorporating the protected lenticular image into a toilet lid.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure provides a toilet lid and seat configured to include decorative or aesthetic elements such as a lenticular 3D image including a protective layer to provide a smooth surface over the lenticular 3D images. The toilet lid and seat according to this disclosure offer many advantages. The toilet lid and seat may be customized with one or more images to convey a message or impression that may be of interest to a user.

In addition, the toilet lid and seat according to embodiments of this disclosure may be constructed to provide a smooth surface from a protective layer, over what is ordinarily a rough and uneven lenticular lens surface. Having a smooth surface allows for greater ease in cleaning when compared to unprotected lenticular 3D-adorned items.

In general, lenticular 3D images create the visual impression that portions of the image are closer to the viewer while other portions of the image are further away. Motion effect lenticular images, when viewed at different angles, appear to move or create a movie like image.

The protective layer, according to embodiments of this disclosure, may comprise a cover sheet made from any number of materials such as Polymethylmethacrylate (PMMA), Polyethylene Terephthalate (PET), Propylene Carbonate (PC), Polyethylene (PE), Polypropylene (PP), and/or Polyvinyl Chloride (PVC). The manufacturing process as well as the material used for the toilet seat is taken into consideration when determining which method of attaching and protecting the lenticular 3D image should be selected. A variety of methods for attaching and protecting the lenticular 3D image are described below in greater detail in various embodiments.

Figure 1:
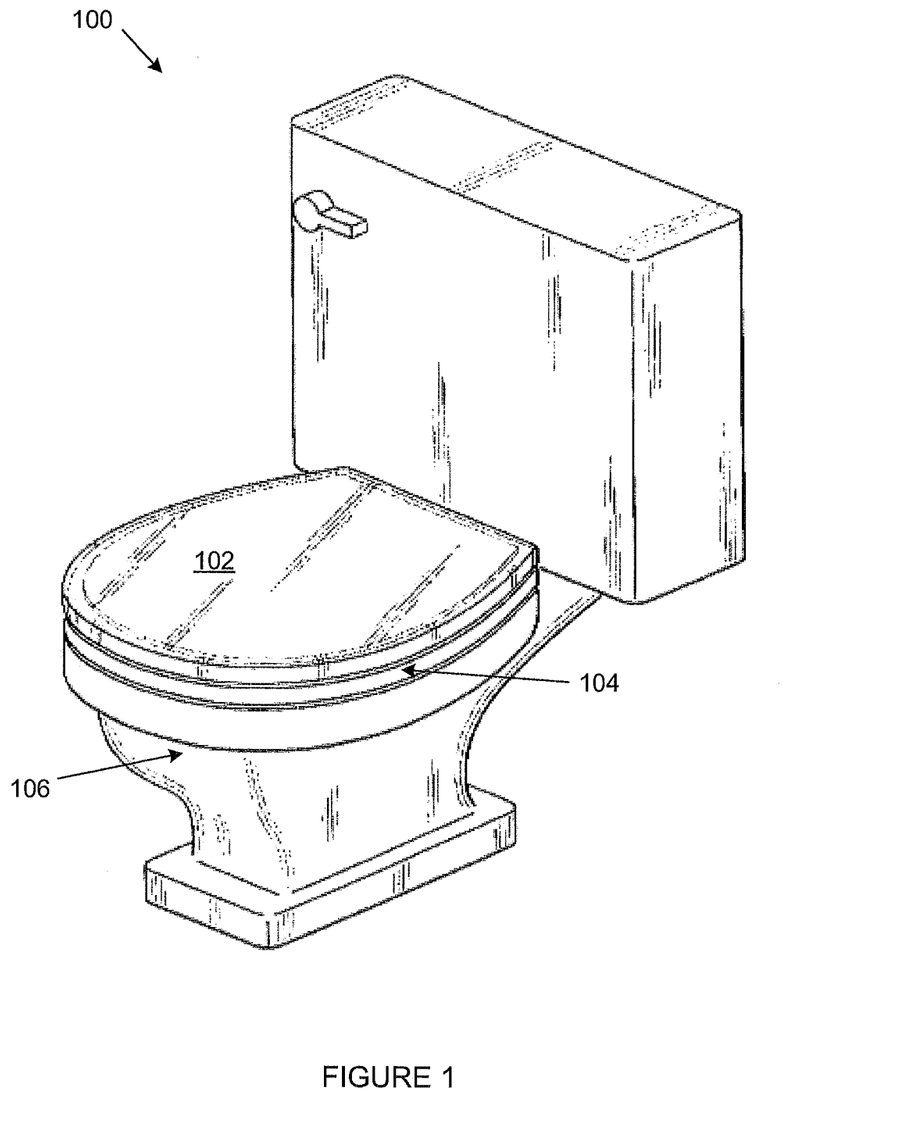
FIG. 1 illustrates a toilet with a toilet lid and seat, according to embodiments of the present disclosure.

FIG. 1 illustrates a toilet with a toilet lid and seat, according to the present disclosure. The embodiment of the toilet shown in FIG. 1 is for illustration only. Other embodiments of the toilet could be used without departing from the scope of this disclosure.

As shown in FIG. 1, a toilet 100 is fitted with a toilet lid 102 and toilet seat 104 over a bowl 106. The toilet 100 may be any suitable toilet with a bowl that is configured to be covered by a seat and lid. The bowl 106 has an opening that is generally round or oval in shape. The toilet lid 102 and toilet seat 104 have a size and shape configured to generally match the size and shape of the bowl 106 and to cover the opening of the bowl 106. The toilet lid 102 and toilet seat 104 attach to a rear portion of the bowl 106 or toilet 100 using hinged hardware that allow the toilet lid 102 and toilet seat 104 to raise and lower independently with respect to the bowl 106 and to each other, as is known in the art.

Although FIG. 1 depicts one example of a toilet 100 with a toilet lid 102 and toilet seat 104, various changes may be made to FIG. 1. For example, while the bowl 106 is depicted as generally round or oval in shape, the bowl 106 could include other shapes, such as a rectangle or octagon. Likewise, the toilet lid 102 and toilet seat 104 could also include other shapes in order to match, or be different from, the bowl 106.

Figure 2:
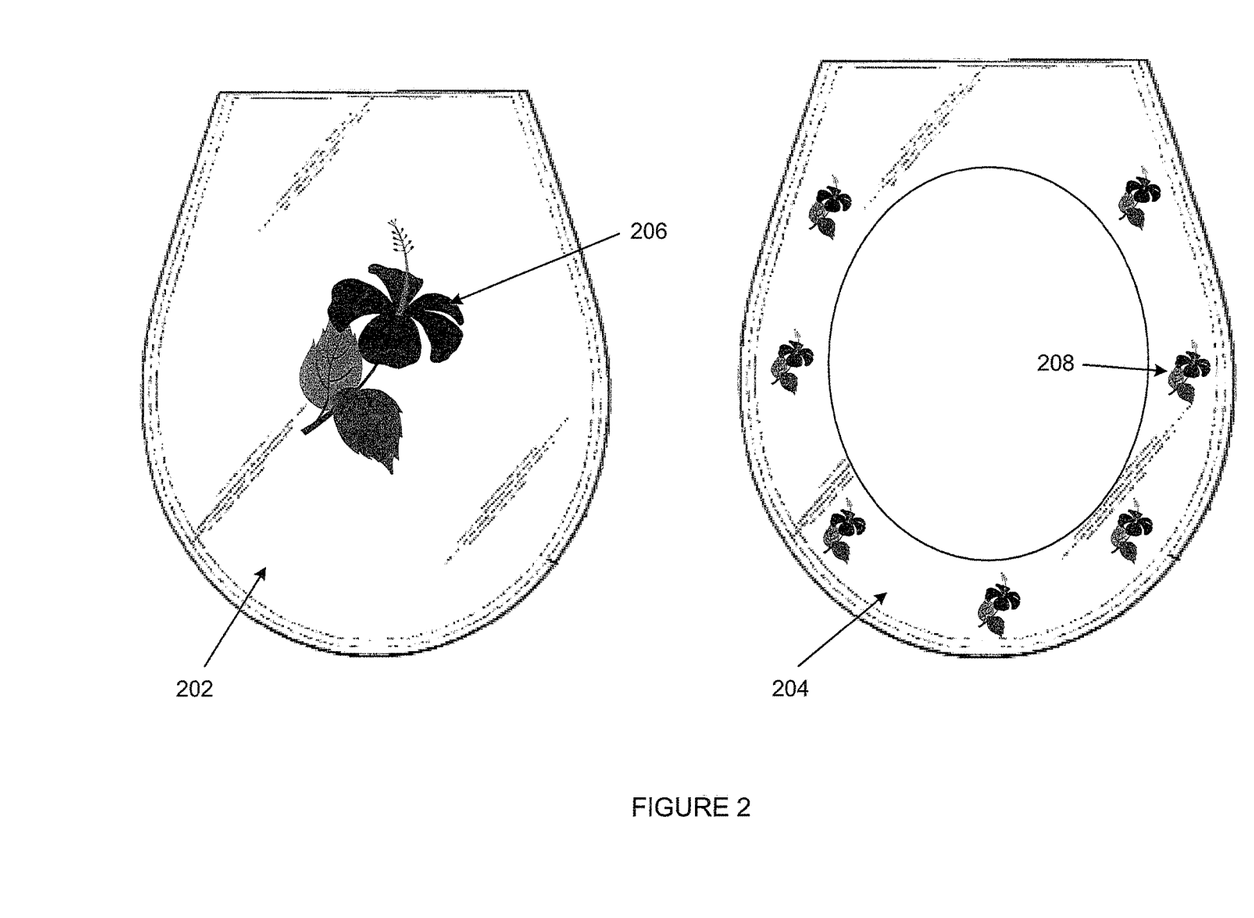
FIG. 2 illustrates top plan views of a toilet lid and toilet seat, according to embodiments of the present disclosure.

FIG. 2 illustrates top plan views of a toilet lid and toilet seat, according to the present disclosure. The embodiment of the toilet lid 202 and toilet seat 204 shown in FIG. 2 is for illustration only. Other embodiments of the toilet lid 202 and seat 204 could be used without departing from the scope of this disclosure. For ease of explanation, the toilet lid 202 and toilet seat 204 may represent the toilet lid 102 and toilet seat 104 of FIG. 1. It will be understood, however, that the toilet lid 202 and toilet seat 204 may represent any other suitable toilet lid and toilet seat.

As shown in FIG. 2, in various disclosed embodiments, the top surface of the toilet lid 202 includes a 3D lenticular image 206. Likewise, the top surface of the toilet seat 204 includes one or more 3D lenticular images 208. The 3D lenticular images 206, 208 may represent any picture, graphic, text, or other image, and are customizable to appeal to a user of a toilet where the toilet lid 202 and seat 204 are installed. In certain embodiments, the 3D lenticular images 206, 208 may be chosen to match or coordinate with a particular decorative scheme of a bathroom or restroom where the toilet is installed. In other embodiments, the 3D lenticular images 206, 208 may be chosen to display or feature a logo or trademark of a business. In still other embodiments, the 3D lenticular images 206, 208 may be chosen to display or feature a picture or design that reflects an interest or hobby of a homeowner.

The 3D lenticular images 206, 208 are applied to the toilet lid 202 and toilet seat 204. A protective layer over the 3D images 206, 208 covers the texture and results in a smooth surface while maintaining the visual characteristics of the 3D lenticular images 206, 208, as explained in greater detail below. Thus, the 3D lenticular images 206, 208 are protected from degradation and wear, and with the smooth surface, the toilet seat and lid are more easily cleaned.

Although FIG. 2 depicts one example of a toilet lid 202 and toilet seat 204, various changes may be made to FIG. 2. For example, while the toilet lid 202 and toilet seat 204 are both shown with 3D lenticular images, in other embodiments, only one of the toilet lid 202 and toilet seat 204 may include a graphic. As another example, while only the top surfaces of the toilet 202 and toilet seat 204 are shown with a 3D lenticular image, the bottom surfaces of the toilet lid 202 and/or toilet seat 204 may also include a 3D lenticular image. As yet another example, while the 3D lenticular images 206, 208 are depicted as having the same image, in other embodiments, the 3D lenticular images 206, 208 could include different images or coordinating images.

The 3D lenticular image may be applied to various materials used to make toilet seats such as medium density fiberboard (MDF), high density fiberboard (HDF), cast polyurethane and cast acrylic (polyresin seats), molded wood, molded wood with veneer, and polypropylene.

For ease of explanation, the remaining disclosure will generally refer only to a toilet lid. However, it will be understood that the embodiments described below are also applicable to a toilet seat, or both, as described previously.

Figure 3A:
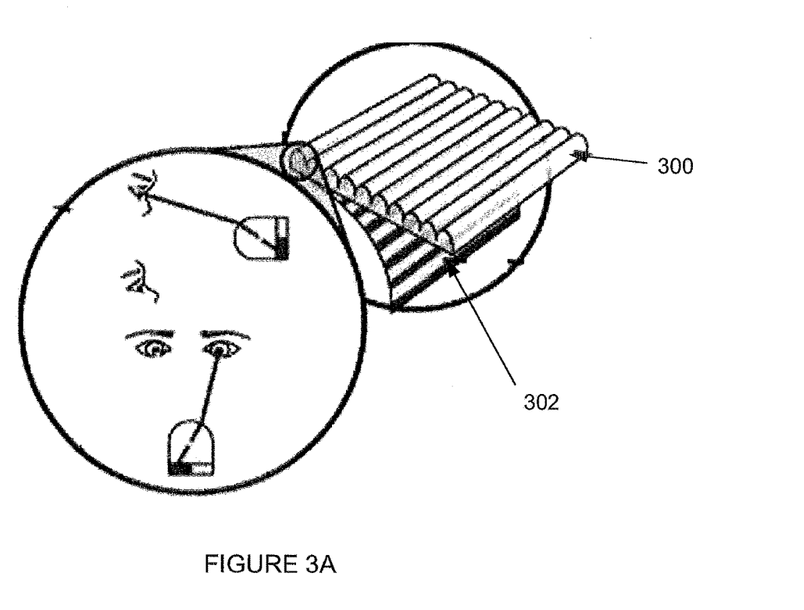
FIGS. 3A and 3B illustrate cross-section views of a lenticular lens, according to embodiments of the present disclosure.
Figure 3B:
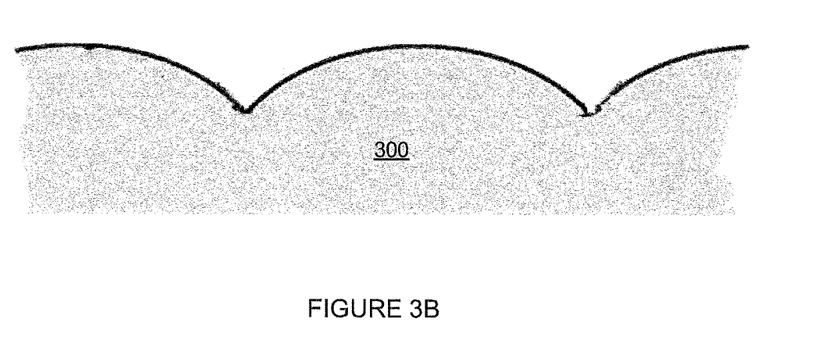

FIGS. 3A and 3B illustrate cross-section views of a lenticular lens 300, according to embodiments of the present disclosure. In order to generate an image having a 3D effect, the surface of the lenticular lens 300 is made of a series of arches. The lenticular image 302 comprises two or more individual images that are interlaced in bands across the image 302. Arches on the lenticular lens 300 cause a shift in the lenticular image 302 that allows a viewer to see one of the individual images making up a complete image below the lenticular lens 300, without seeing the other image(s). The arches that allow for the 3D effects also cause the surface to be uneven and not smooth.

Figure 4:
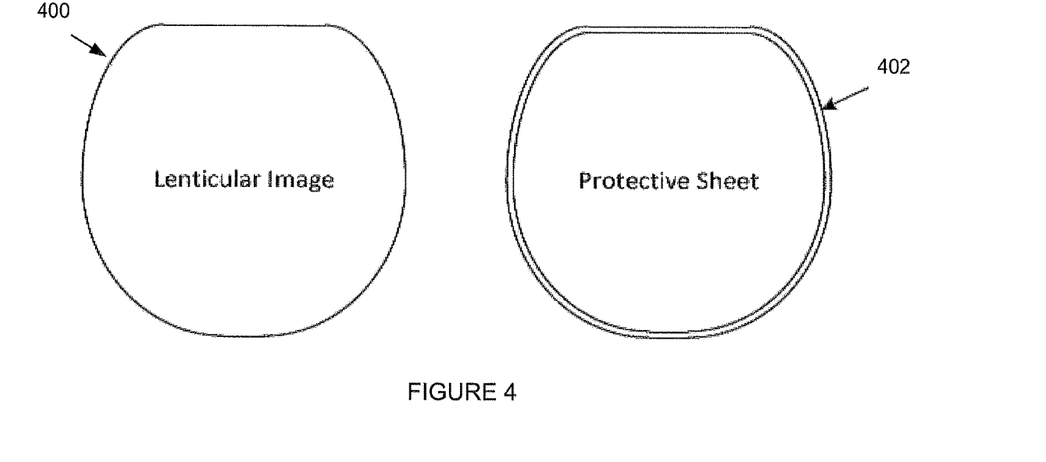
FIG. 4 illustrates a lenticular image and a protective sheet in the general shape of a toilet seat cover, according to embodiments of the present disclosure.

FIG. 4 illustrates a lenticular image 400 and a protective sheet 402 in the general shape of a toilet seat, according to embodiments of the present disclosure. In various embodiments of the present disclosure, the protective sheet 402 is clear and smooth and can be made out of a variety of different materials such as polymethylmethacrylate (PMMA), polyethylene terephthalate (PET), propylene carbonate (PC), polyethylene (PE), polypropylene (PP), and/or polyvinyl chloride (PVC). In one embodiment, the protective sheet 402 is approximately 0.02 inches in thickness; however the thickness may be greater or less as required by the application. The protective sheet 402 may be placed over the lenticular image 400 and is generally the same size as the lenticular image 400. Although only a lenticular image 400 is depicted, it is understood that in production, a lenticular image 400 is fixed to a lenticular lens. Therefore, when referencing a lenticular image, a lenticular lens should also be considered to be referenced, unless specified otherwise.

Figure 5:
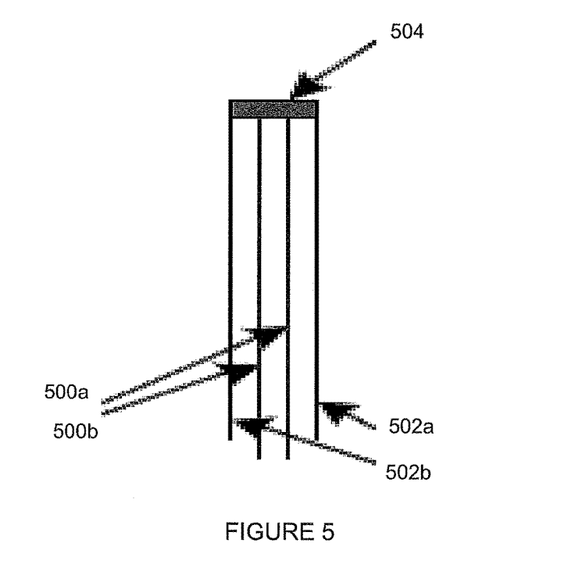
FIG. 5 illustrates lenticular images sealed within protective sheets, according to embodiments of the present disclosure.

FIG. 5 illustrates lenticular images 500a, 500b (collectively 500) sealed within protective sheets 502a, 502b (collectively 502), according to embodiments of the present disclosure. The embodiment disclosed in FIG. 5 is suitable for use in protecting lenticular images 500 in polyresin seats, but may also apply to other materials.

As shown in FIG. 5, lenticular images 500 may be bound by protective layers 502 and sealed with a sealing agent 504. For clarity of illustration, the thickness of each layer 500-504 may not be drawn to scale.

In various embodiments of the present disclosure, the lenticular images 500a and 500b may be placed back to back as shown in FIG. 5. By placing the images 500 back to back, the images 500 can be visible from both sides, which may be desirable when the toilet seat material is see-through, rather than opaque. In other disclosed embodiments, only one lenticular image 500 may be present, making the image 500 visible from only one side.

The sealing agent 504 in various embodiments of the present disclosure may be glue, tape, adhesive, acrylic thread, heat weld, or any other suitable sealing agent. By sealing edges of the protective sheets 502 to the lenticular images 500, the lenticular images 500, which are embodied on a lenticular lens, are protected from being deformed by solvents used in casting material.

In disclosed embodiments, such as when manufacturing a polyresin toilet lid, sealed edges of the protective sheets 502 will not allow the casting material used in the process to fill valleys in the lenticular lens. This barrier is important, as any change to the valleys of the lenticular lens could render the lenticular lens ineffective.

In one embodiment of the present invention, double face transparent tape or a thin band of adhesive may be used as a sealing agent 504 around the perimeter of the protective sheets 502 to seal the edge.

Figure 6:
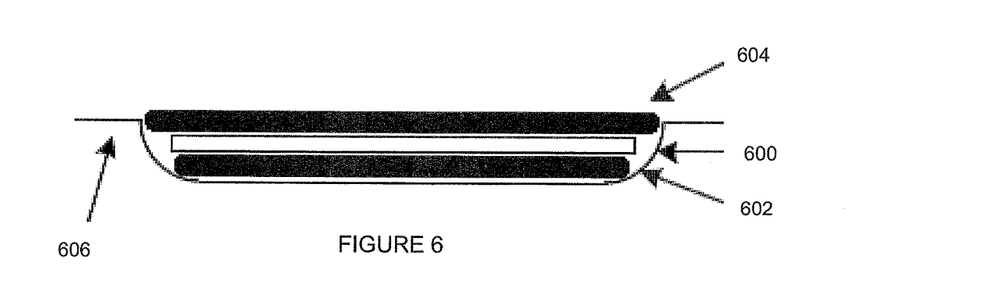
FIG. 6 illustrates a protected lenticular image cast in a polyresin toilet seat, according to embodiments of the present disclosure.

FIG. 6 illustrates a protected lenticular image 600 cast in a polyresin toilet seat, according to embodiments of the present disclosure. The protected lenticular image 600 may be placed between a first layer of resin 602 and a second layer of resin 604 within a casting mold 606. When the second layer of resin 604 is poured on top of the lenticular image 600, the lenticular image 600 becomes encased within the toilet seat.

The protected lenticular image 600 generically refers to a 3D lenticular image that has been sealed with a protective layer, in a manner similar to the one described in FIG. 5. While FIG. 5 describes using a sealing agent, any suitable manner of protecting the lenticular image as disclosed herein may be used. Because the lenticular image has been protected, when being cast into the toilet seat, the casting material is kept out and the desired lenticular visual qualities are unaffected.

Figure 7A:
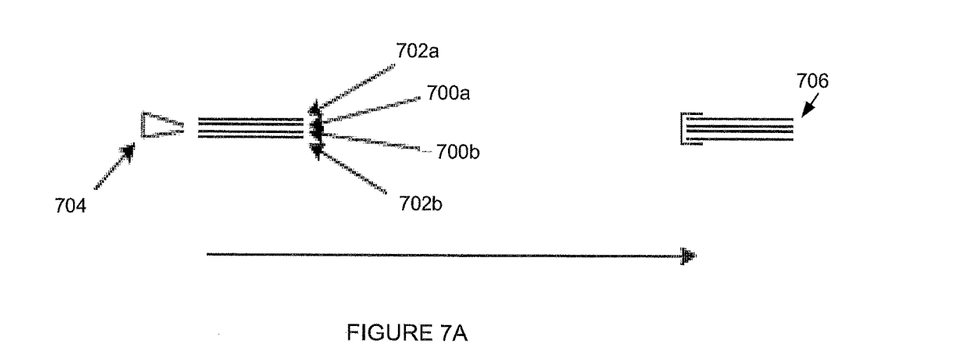
FIGS. 7A and 7B illustrate alternate methods for protecting lenticular images by clipping together protective sheets with a straight clip or a rounded clip, according to embodiments of the present disclosure.
Figure 7B:
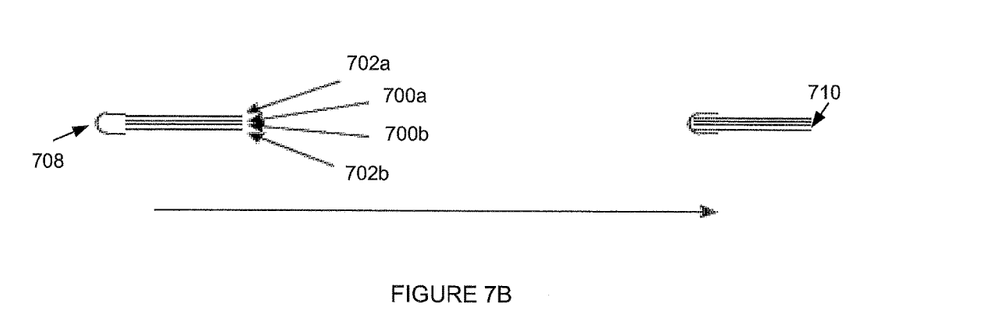

FIGS. 7A and 7B illustrate alternate methods for protecting lenticular images 700a and 700b (collectively 700) by clipping together protective sheets 702a and 702b (collectively 702) with a straight clip 704 or a rounded clip 708, according to embodiments of the present disclosure. Rather than using a sealing agent as described in FIG. 5, a straight clip 704 or a rounded clip 708 functions to hold the protective sheets 702 to the images 700 in a similar way. A straight clip-protected image 706 and a round clip-protected image 710 are also illustrated in the figure to depict how a profile view of the different clips would appear. In various embodiments of the present disclosure, the protected images 706 and 710 may be cast into a polyresin seat as described in FIG. 6.

Figure 8A:
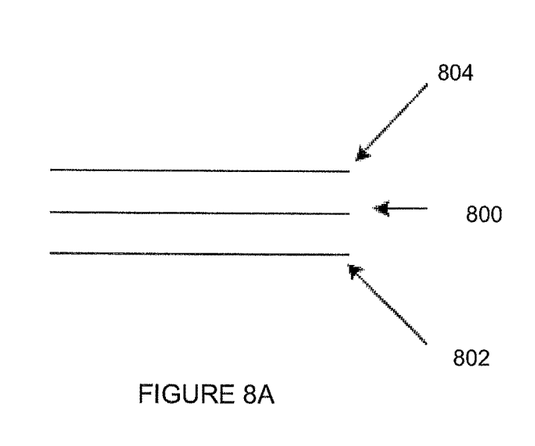
FIGS. 8A, 8B, and 8C illustrate a 3-D lenticular image applied to medium density fiberboard or high density fiberboard, according to embodiments of the present disclosure.
Figure 8B:
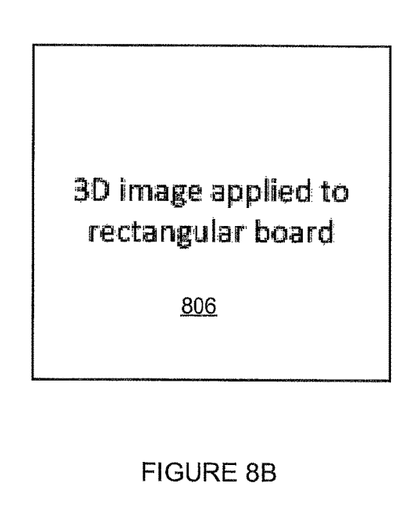
Figure 8C:
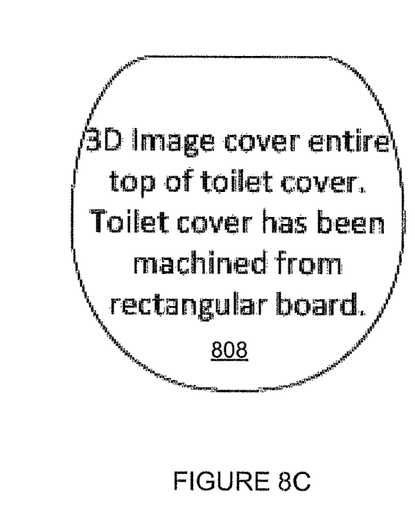

FIGS. 8A, 8B, and 8C illustrate a 3-D lenticular image applied to Medium Density Fiberboard (MDF) or High Density Fiberboard (HDF), according to embodiments of the present disclosure. Rather than being located between two protective sheets and cast in a resin like material, with materials such as MDF, HDF, molded wood, or molded wood with veneer, images are generally applied to a surface of the material. In various embodiments of the present disclosure, a 3D lenticular image 800 may be adhered to an MDF or HDF seat using an adhesive coating 802 and covered with a protective sheet 804 on the external surface.

With regard to FIGS. 8B and 8C, when using MDF and HDF, seats may be machined from a rectangular board or sheet 806 into the final shape of a toilet seat/cover 808. In various embodiments of the present disclosure, the image 800 is applied to the rectangular board 806 and covers the entire top of a toilet cover 808 that is machined from the rectangular board, as shown in FIG. 8C.

Figure 9:
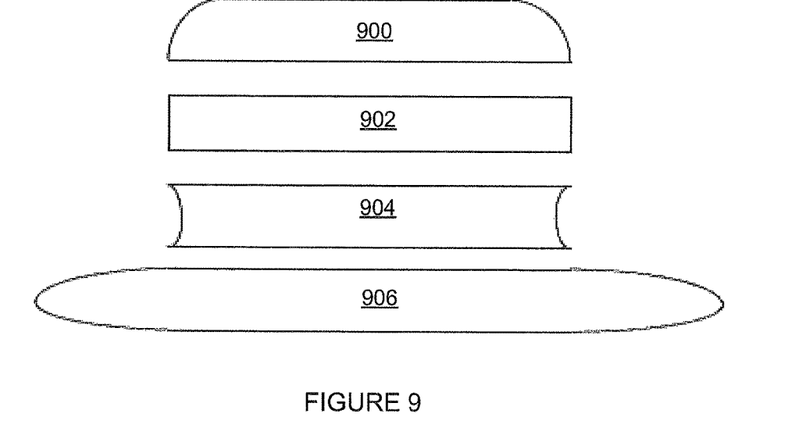
FIG. 9 illustrates various edge profiles generated according to embodiments of the present disclosure.

FIG. 9 illustrates various edge profiles 900-906 that may be generated according to embodiments of the present disclosure. When a rectangular board, such as the rectangular board 806 from FIG. 8 is machined into the shape of a toilet seat, different edges may be generated. The edge profiles 900-906 are not intended to limit the disclosure to particular styles, rather they are illustrative in nature.

Figure 10A:
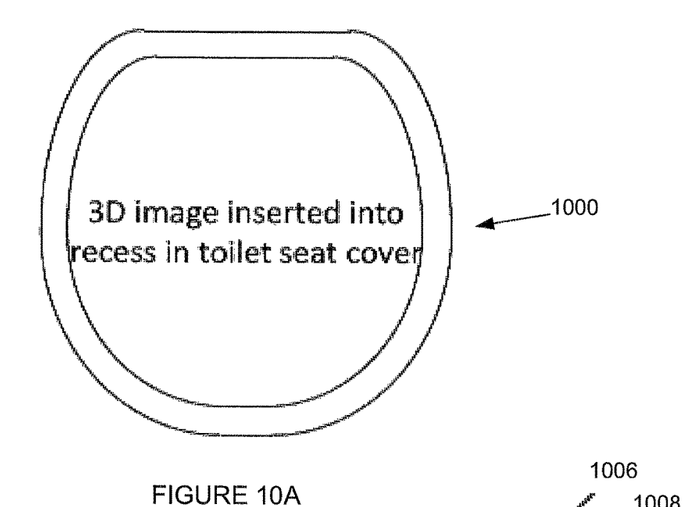
FIG. 10A illustrates a top view of a lenticular image inserted into a recess of a toilet seat cover, according to embodiments of the present disclosure.
Figure 10B:
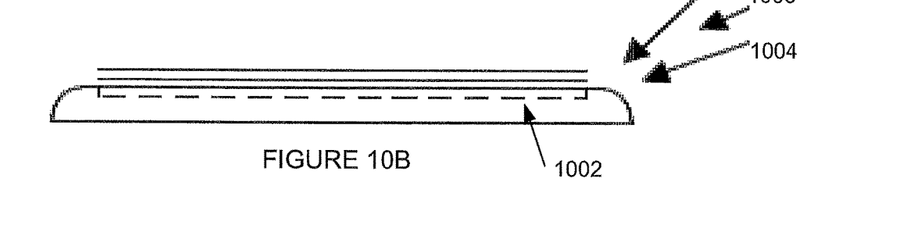
FIG. 10B illustrates a profile view of a lenticular image inserted into a recess of a toilet seat cover, according to embodiments of the present disclosure.

FIG. 10A illustrates a top view 1000 of a lenticular image inserted into a recess of a toilet seat cover, according to embodiments of the present disclosure. FIG. 10B illustrates a profile view of a lenticular image inserted into a recess of a toilet seat cover, according to embodiments of the present disclosure. For MDF and HDF manufactured toilet seat covers, a recess 1002 may be machined into the top surface of the cover. A lenticular image 1004 may be adhered to a protective sheet 1006 using double face tape or other adhesive 1008.

The recess 1002 may be machined to the same depth as the thickness of the image 1004 and protective sheet 1006 in various embodiments of the present disclosure, providing a flush appearance.

In various embodiments of the disclosure, for molded wood or molded wood with veneer, a mold making the toilet seat cover is built so that a recess 1002 is molded directly into the cover. In other embodiments of the disclosure, rather than the recess 1002 being molded into the cover, a recess 1002 may be machined into the surface. Although not shown in FIG. 10B, adhesive may also be used to apply the protected image to the recess 1002 in the toilet seat cover.

Figure 11A:
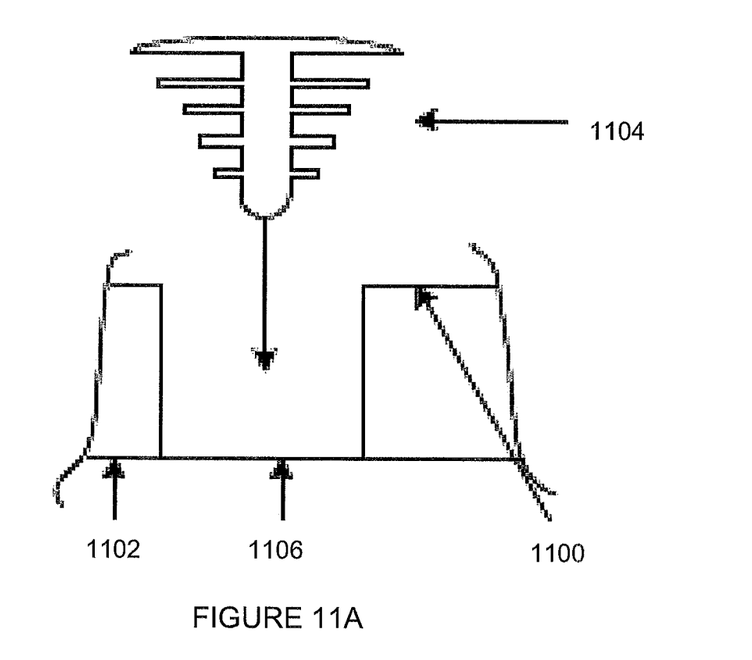
FIGS. 11A and 11B illustrates an extruded PVC profile inserted into a gap to secure a protected lenticular image to a toilet seat cover, according to embodiments of the present disclosure.
Figure 11B:
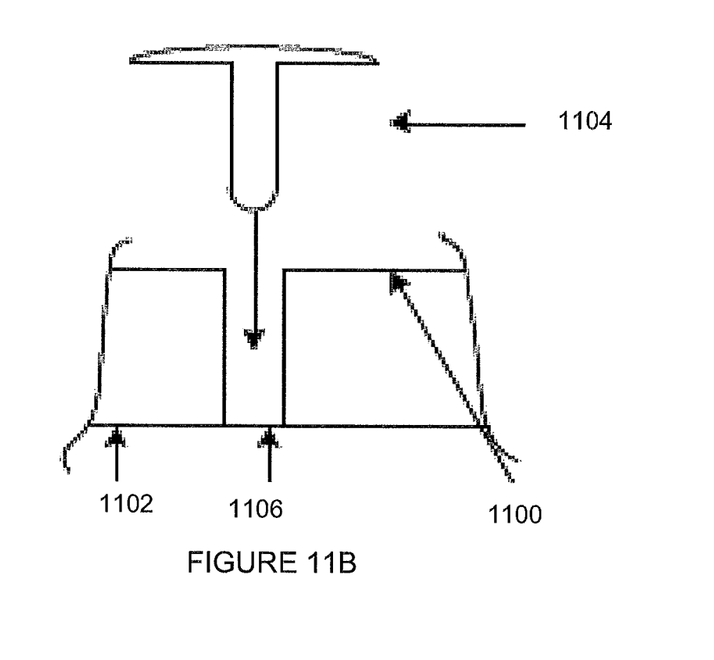

FIGS. 11A and 11B illustrate an extruded PVC profile 1104 inserted into a gap 1106 to secure a protected lenticular image 1100 to a toilet seat cover 1102, according to embodiments of the present disclosure. Rather than being secured to the toilet seat cover surface with adhesive, in various embodiments of the present invention, the protected lenticular image 1100 can be secured using an extruded PVC profile 1104 of various shapes and sizes. This embodiment works well for applying protected lenticular images 1100 to MDF, HDF, molded wood, and molded wood with veneer.

Previously described methods of creating a recess and creating a protective sheet 1100 may be used. By inserting an extruded profile of flexible PVC into a gap 1106 as shown, the protected image 1100 can be held in place.

Figure 12:
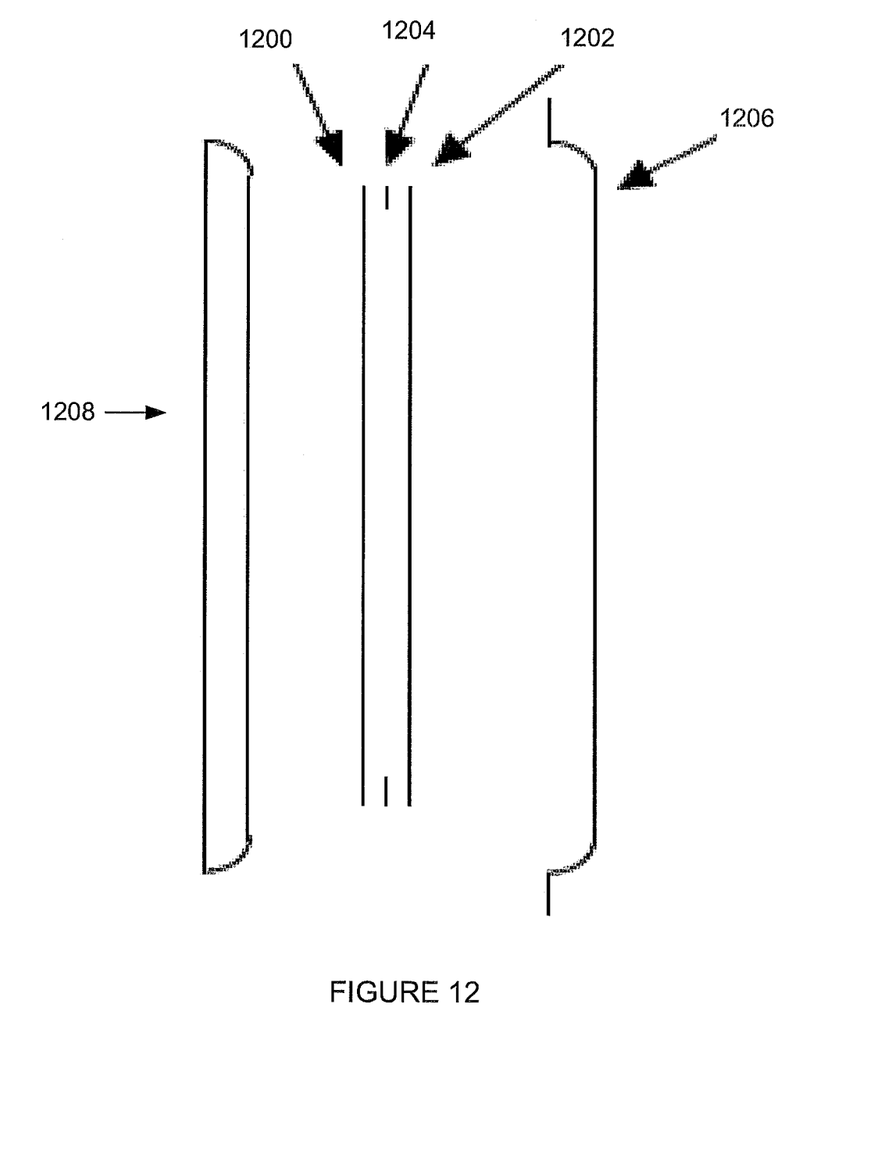
FIG. 12 illustrates an application of a protected lenticular 3D image to polypropylene toilet seats, according to embodiments of the present disclosure.

FIG. 12 illustrates an application of a protected lenticular 3D image to polypropylene toilet seats, according to embodiments of the present disclosure. A lenticular 3D image 1200 may be attached to a protective sheet 1202 using an adhesive agent 1204, such as double face tape or other adhesive. In various embodiments of the present disclosure the adhesive agent 1204 may be transparent, allowing the lenticular image 1200 to be attached to the protective sheet 1202 without visibly altering the image. The lenticular image 1200 combined with the protective sheet 1202 may be referred to as a protected image.

The protected image may be mounted to an injection mold 1206 surface using methods known in the art for inlaid molding. A top portion of the mold 1208 completes the mold, allowing it to close. Molten plastic may then be injected into the mold and cooled, encapsulating the protected sheet 1202 with the lenticular image 1200 into the surface of the polypropylene toilet seat or lid.

Figure 13:
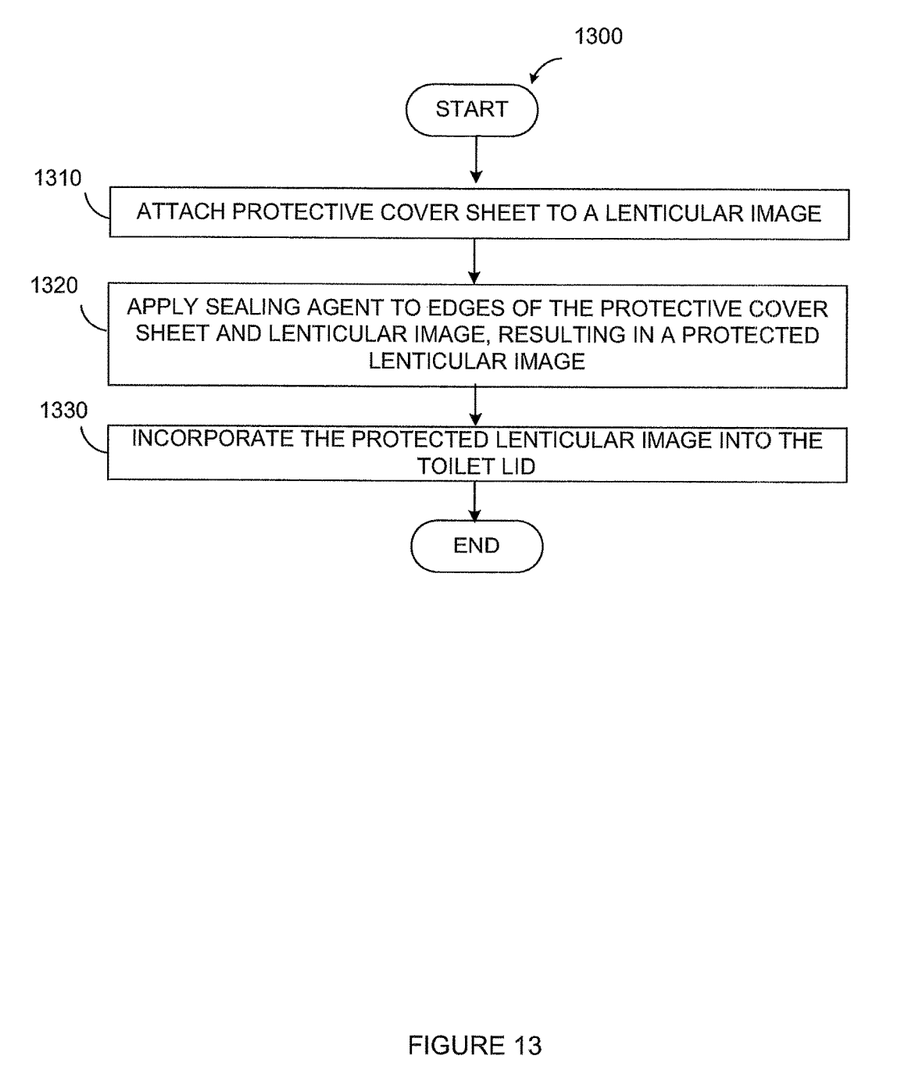
FIG. 13 depicts a method for manufacturing a toilet lid with a smooth lenticular three-dimensional image, according to the present disclosure.

FIG. 13 depicts a method for manufacturing a toilet lid with a smooth lenticular three-dimensional image, according to the present disclosure. The method shown in FIG. 13 is for illustration only. Other embodiments of the method could be used without departing from the scope of this disclosure.

First, a protective cover sheet is attached to a lenticular image (step 1310). In some embodiments, the protective cover sheet is attached to both sides of a lenticular image. In other embodiments, rather than a single lenticular image, multiple lenticular images may be placed back to back, with protective cover sheets being attached on both sides of the back to back lenticular images. Depending upon where the lenticular image will ultimately be placed, the lenticular image may only need to be protected on one side (such as for MDF or wood), whereas for other applications, it will be necessary to be protected on both sides (such as for polyresin cast molding).

Next, a sealing agent is applied to the edges of the protective cover sheet and lenticular image, resulting in a protected lenticular image (step 1320). The sealing agent may be an adhesive, acrylic thread, heat sealing, or a variety of clips suitable to adhere the edges of the protective cover sheet(s) to the lenticular image(s).

Next, the protected lenticular image is incorporated into the toilet lid (step 1330). The protected lenticular image may be incorporated into the toilet lid by using cast molding, injection molding, machining a recess into the toilet lid surface and using adhesive to hold the protected lenticular image, machining a recess into the toilet lid surface and using an extruded PVC profile to hold the protected lenticular image, or any number of other methods.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A toilet lid assembly, comprising:
  a toilet seat; and
  a toilet lid connected to the toiled seat by hinged hardware, the toilet lid having a lenticular three-dimensional image comprising:
    a protective cover sheet disposed over a ribbed lens surface of the lenticular image, the ribbed lens surface comprising a plurality of arches forming a plurality of valleys between the arches, wherein the protective cover sheet does not occupy any of the valleys between the arches;
    a sealing agent applied to edges of the protective cover sheet and lenticular image, resulting in a protected lenticular image; and
    the protected lenticular image incorporated into the toilet lid.

2. The toilet lid assembly of claim 1, further comprising:
  a second protective cover sheet attached to the lenticular image, wherein the protected lenticular image has an attached protective cover sheet on both sides.

3. The toilet lid assembly of claim 2, wherein the protected lenticular image is incorporated into the toilet lid by casting the protected lenticular image having an attached protective cover sheet on both sides into a polyresin composite material, using a casting mold.

4. The toilet lid assembly of claim 2, wherein the protected lenticular image is incorporated into the toilet lid by using an injection mold and molten plastic.

5. The toilet lid assembly of claim 1, wherein the sealing agent is at least one of an adhesive, tape, acrylic thread, heat sealing, or a flexible clear extruded thermoplastic.

6. The toilet lid assembly of claim 1, wherein the protective cover sheet is smooth and comprises one of polymethylmethacrylate (PMMA), polyethylene terephthalate (PET), propylene carbonate (PC), polyethylene (PE), polypropylene (PP), or polyvinyl chloride (PVC).

7. A toilet lid having a lenticular three-dimensional image, comprising:
  a protective cover sheet disposed over a ribbed lens surface of the lenticular image, the ribbed lens surface comprising a plurality of arches forming a plurality of valleys between the arches, wherein the protective cover sheet does not occupy any of the valleys between the arches;
  a sealing agent applied to edges of the protective cover sheet and lenticular image, resulting in a protected lenticular image; and
  the protected lenticular image incorporated into the toilet lid.

8. The toilet lid of claim 7, further comprising a second protective cover sheet, wherein the protected lenticular image has an attached protective cover sheet on both sides.

9. The toilet lid of claim 8, wherein the protected lenticular image is incorporated into the toilet lid by casting the protected lenticular image having an attached protective cover sheet on both sides into a polyresin toilet lid, using a casting mold.

10. The toilet lid of claim 7, further comprising:
  an adhesive coating applied to a surface of the toilet lid; and
  the protected lenticular image applied to the adhesive coating.

11. The toilet lid of claim 7, further comprising:
  a recess machined into a top surface of the toilet lid; and
  the protected lenticular image applied within the recess, wherein the protected lenticular image is applied using adhesive or an extruded PVC profile inserted into a gap to hold the image in place.

12. The toilet lid of claim 7, wherein the sealing agent is at least one of an adhesive, tape, acrylic thread, heat sealing, or a flexible clear extruded thermoplastic.

13. The toilet lid of claim 7, wherein the protective cover sheet is smooth and comprises one of polymethylmethacrylate (PMMA), Polyethylene terephthalate (PET), propylene carbonate (PC), polyethylene (PE), polypropylene (PP), or polyvinyl chloride (PVC).

14. A method of manufacturing a toilet lid with a smooth lenticular three-dimensional image, the method comprising:
  applying a protective cover sheet over a ribbed lens surface of the lenticular image, the ribbed lens surface comprising a plurality of arches forming a plurality of valleys between the arches, wherein the protective cover sheet does not occupy any of the valleys between the arches;

applying a sealing agent to edges of the protective cover sheet and lenticular image, resulting in a protected lenticular image; and incorporating the protected lenticular image into the toilet lid.

15. The method of claim 14, further comprising:
attaching a second protective cover sheet, wherein the protected lenticular image has an attached protective cover sheet on both sides.

16. The method of claim 15, wherein incorporating the protected lenticular image comprises casting the protected lenticular image having an attached protective cover sheet on both sides into a polyresin toilet lid, using a casting mold.

17. The method of claim 14, further comprising:
applying an adhesive coating to a surface of the toilet lid; and
applying the protected lenticular image to the adhesive coating.

18. The method of claim 14, further comprising:
machining a recess into a top surface of the toilet lid; and
applying the protected lenticular image within the recess, wherein the protected lenticular image is applied using adhesive or an extruded PVC profile inserted into a gap to hold the image in place.

19. The method of claim 14, wherein the sealing agent is at least one of an adhesive, tape, acrylic thread, heat sealing, or a flexible clear extruded thermoplastic.

20. The method of claim 14, wherein the protective cover sheet is smooth and comprises one of polymethylmethacrylate (PMMA), polyethylene terephthalate (PET), propylene carbonate (PC), polyethylene (PE), polypropylene (PP), or polyvinyl chloride (PVC).

* * * * *